United States Patent
Wang et al.

(10) Patent No.: US 8,457,202 B2
(45) Date of Patent: Jun. 4, 2013

(54) METHOD AND APPARATUS FOR DETERMINING EXPECTED DISTORTION IN DECODED VIDEO BLOCKS

(75) Inventors: Yao Wang, Livingston, NJ (US); Jill MacDonald Boyce, Manapalan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1035 days.

(21) Appl. No.: 12/310,277

(22) PCT Filed: Aug. 21, 2007

(86) PCT No.: PCT/US2007/018480
§ 371 (c)(1),
(2), (4) Date: Feb. 18, 2009

(87) PCT Pub. No.: WO2008/027249
PCT Pub. Date: Mar. 6, 2008

(65) Prior Publication Data
US 2010/0239015 A1    Sep. 23, 2010

Related U.S. Application Data

(60) Provisional application No. 60/823,748, filed on Aug. 28, 2006.

(51) Int. Cl.
*H04N 7/26* (2006.01)
(52) U.S. Cl.
USPC ............... 375/240.13; 375/240.16
(58) Field of Classification Search
USPC ..................................... 375/240.13
See application file for complete search history.

(56) References Cited

U.S. PATENT DOCUMENTS

| | | | |
|---|---|---|---|
| 2006/0239355 A1* | 10/2006 | Sriram et al. | 375/240.16 |
| 2007/0030894 A1* | 2/2007 | Tian et al. | 375/240.02 |
| 2007/0140339 A1* | 6/2007 | Bhaskaran et al. | 375/240.12 |
| 2008/0089414 A1* | 4/2008 | Wang et al. | 375/240.13 |
| 2009/0304084 A1* | 12/2009 | Hallapuro et al. | 375/240.16 |

FOREIGN PATENT DOCUMENTS

| WO | WO 2006078595 | 7/2006 |
|---|---|---|
| WO | WO2007084475 | 7/2007 |

OTHER PUBLICATIONS

Zhang et al., "Video Coding with Optimal Intra/Inter Mode Switching for Packet Loss Resilience", IEEE Journal on Selected Areas in Communication, vol. 18, No. 6, pp. 996-976, Jun. 2000.
Cote et al., "Optimal Intra Coding of Blocks for Robust Video Communication Over the Internet," Signal Processing: Image Communication 15, pp. 24-34, 1999.

(Continued)

*Primary Examiner* — Matthew Smithers
(74) *Attorney, Agent, or Firm* — Robert D. Shedd; Guy H. Eriksen

(57) ABSTRACT

There are provided methods and apparatus for determining expected distortion in decoded video blocks. An apparatus includes a distortion calculator for calculating an expected distortion for an image block, included in a picture of a video sequence and sent over a lossy channel, using a motion vector for the image block when the motion vector has a non-integer value. The distortion calculator calculates the expected distortion based upon a propagated distortion of at least two neighboring integer pixel positions in a reference picture with respect to the motion vector having the non-integer value. The image block is coded in an inter mode or a SKIP mode.

25 Claims, 5 Drawing Sheets

OTHER PUBLICATIONS

Cote et al., Optimal Mode Selection and Synchronization for Robust Video Communications Over Error-Prone Networks, IEEE Journal on Selected Areas in Communications, vol. 18, No. 6, Jun. 2000.

Ekmekci et al., "Recursive Decoder Distortion Estimation Based on AR(1) Source Modeling for Video" 2004 International Conference on Image processing (ICIP), 2004 IEEE.

Hong et al., "Video Error Concealment Techniques," Signal Processing: Image Communications, vol. 14, pp. 437-492, 1999.

Hong et al., Error Concealment Algorithms for Compressed Video, Signal Processing: Image Communication 14, pps. 473-492, 1999.

Lin et al., "Bit-Rate Control Using Piecewise Approximated Rate-Distortion Characteristics," IEEE Transactions on Circuits and Systems for Video Technology, vol. 8, No. 4, Aug. 1998.

Schuster et al., "A Review of the Minimum Maximum Criterion for Optimal Bit Allocation Among Dependent Quantizers", IEEE Transactions on Multimedia, vol. 1, No. 1, Mar. 1999.

Sullivan et al., "Rate-Distrotion Optimization for Video Compression," IEEE Signal Processing Magazine, 1998.

Wang et al, "Modeling of Transmission-Loss-Induced Distortion in Decoded Video," IEEE Transactions on Circuits and Systems for Video Technology, vol. 16, No. 6, Jun. 2006.

Wang et al., "Modelling of Distortion Caused by Packet Losses in Video Transport", Polytechnic University, Brooklyn, NY XP002468155.

Wiegand et al., "Error-Resilient Video Transmission Using Long-Term Memory Motion-Compensated Prediction", IEEE Journal on Selected Areas in Communications, vol. 18, No. 6, pp. 1050-1062, Jun. 2000.

Wiegand et al., "Lagrange Multiplier Selection in Hybrid Video Coder Control," 2001 IEEE.

Yang et al, "Advances in Recursive per-Pixel Estimation of End-to-End Distortion for Application in H.264," Department of Electrical and Computer Engineering, 2005 IEEE.

Yang et al., "Rate-Distortion Optimized Motion Estimation for Error Resilient Video Coding", Department of Electrical and Computer Engineering, 2005 IEEE.

Yang et al., "Recursive End-To-End Distortion Estimation with Model-Based Cross-Correlation Approximation", Department of Electrical and Computer Engineering, 2003 IEEE.

Zhang et al., "Optimum End-to-Distortion Estimation for Error Resilient Video Coding" Chinese Academy of Science, Beijing, China. Xp-002381771, pp. 513-520, 2004.

Search Report 27 Feb. 2008.

He, Z. et al., "Joint Source Channel Rate-Distortion Analysis for Adaptive Mode Selection and Rate Control in Wireless Video Coding", IEEE Transactions on Circuits and Systems for Video Technology, vol. 12, No. 6, pp. 511-523, IEEE, Jun. 2002.

* cited by examiner

METHOD AND APPARATUS FOR DETERMINING EXPECTED DISTORTION IN DECODED VIDEO BLOCKS

CROSS-REFERENCE TO RELATED APPLICATIONS

This application claims the benefit, under 35 U.S.C. §365 of International Application PCT/US2007/018780, filed 21 Aug. 2006, which was published in accordance with PCT Article 21(2) on 6 Mar. 2008, in English and which claims the benefit of U.S. provisional patent application No. 60/823,748 filed 2 Aug. 2006.

FIELD OF THE INVENTION

The present invention relates generally to video encoding and distortion calculation and, more particularly, to methods and apparatus for determining the expected distortion in decoded video blocks.

BACKGROUND OF THE INVENTION

In a typical video encoder, such as those conforming to, for example, the International Telecommunication Union, Telecommunication Sector (ITU-T) H.261 recommendation, the ITU-T H.263 recommendation, the International Organization for Standardization/International Electrotechnical Commission (ISO/IEC) Moving Picture Experts Group-1 (MPEG-1) standard, the ISO/IEC MPEG-2 standard, and the ISO/IEC MPEG-4 Part 10 Advanced Video Coding (AVC) standard/ITU-T H.264 recommendation (hereinafter the "MPEG-4 AVC standard"), a video frame is divided into macroblocks, and each macroblock (MB) may be coded in one of several coding modes. In an inter mode, a motion vector (MV) is first found that points to the best matching block in a previously coded frame, then the difference between this macroblock and its best matching block is coded. Instead of allowing only one motion vector for a macroblock, other inter modes allow the macroblock to be divided into several sub-blocks, and estimate a separate motion vector for each sub-block. Instead of using the frame immediately preceding the current frame, the encoder may also choose among several possible previously encoded frames. For a given inter mode (corresponding to a particular sub-block structure), the motion estimation process determines the best reference frame index and the corresponding motion vector for each macroblock or sub-block by minimizing a motion estimation criterion. In SKIP mode, the encoder presumes the motion vector is zero or predicts the motion vector for this macroblock from the motion vectors of selected neighboring macroblocks that have been coded, and does not code the prediction error. The encoded block is simply the motion compensation block based on the predicted motion vector (which could be zero). In an intra mode, the macroblock is either coded directly or predicted from some previously coded pixels in the same frame (called intra prediction). There are several possible neighborhood patterns for intra prediction, each corresponding to a different intra mode. Among all possible modes, the encoder finally chooses an optimal one, based on a preset mode decision criterion.

In rate-distortion optimized motion estimation and mode selection, both the motion estimation and mode decision criteria are a weighted sum of the distortion of the decoded macroblock and the number of bits used. When the underlying transmission network is not reliable, part of the transmitted video bit stream may be lost. A challenging problem is how to determine the expected distortion at the decoder.

The aforementioned rate-distortion optimized motion estimation and mode decision process requires quantizing and coding the prediction error for each candidate option, so as to determine the quantization distortion and the number of bits required for coding the prediction error. In rate-constrained motion estimation, the criterion used for motion search does not involve the bits required for coding the prediction error, instead involving the prediction error itself.

In most of the prior work on motion estimation and mode decision, the search criterion considers only the quantizer invoked distortion at the encoder (also referred to herein as "quantization distortion"). Specifically, the search criterion is a weighted sum of the quantization distortion and the number of bits needed to code the macroblock using the candidate mode, including the mode information, the motion vectors (if an inter-mode is chosen), and the prediction error signal (or the original pixels if the intra mode does not make use of intra prediction). Such methods are commonly referred to as rate-distortion optimized mode selection. The weight is referred to as the Langrangian multiplier. For motion estimation, simplified search criteria have also been proposed, which uses a weighted sum of the inter-prediction error and the number of bits needed to code the motion vectors. Such methods are commonly referred to as rate-constrained motion estimation.

When a compressed video stream is delivered over a network that may experience bit errors and/or packet losses, the distortion seen at the decoder differs from that at the encoder. The main challenge in rate-distortion optimized motion estimation and mode selection is how to determine the expected decoder distortion for a macroblock given a candidate coding mode and motion vector. A prior art method known as the ROPE method recursively computes and records the first order and second order moments for each pixel in the past decoded frames in the encoder. Based on these recorded first order and second order moments in the previous frames, the encoder can then compute the expected distortion for each macroblock for each candidate coding mode. A problem with the ROPE method is that it is not applicable when motion estimation accuracy is sub-pel, when multiple reference frames are allowed for motion compensation, or when the encoder applies deblocking filtering. The ROPE method is applicable to only a type of error concealment known as frame copy. Also, the ROPE method requires intense computation, since it involves tracking channel distortion at every pixel. An extension of ROPE has been proposed to consider sub-pel motion compensation, however such extension requires substantially more computation than the original ROPE method. Another extension of the ROPE method to motion estimation has been considered, however this extension still assumes integer-pel motion vectors and the use of the frame copy error concealment method.

A prior art approach (hereinafter referred to as the "first prior art approach") considers the channel-induced distortion in mode decision, and computes the expected distortion for each macroblock for a candidate mode. The first prior art approach uses a method for determining the expected distortion that requires the storage of the concealment distortions of all macroblocks in all previously coded frames after an I-frame. As with the ROPE method, the first prior art approach does not take into account sub-pel motion compensation, multiple reference frames for motion compensation, and deblocking filtering.

A second prior art approach involving a block-level decoder distortion model has been proposed that also recursively calculates the expected decoder distortion at the macroblock level. The second prior art approach determines the distortion of the current macroblock by separately considering the cases when the corresponding matching block in the previous frame is received and lost. However, the second prior art approach is only applicable when the encoder motion vectors are available at the decoder for error concealment. Moreover, the second prior art approach separately needs to track the distortion when a block is received and the distortion when a block is lost, for each macroblock in each past frame, hence requiring a significant amount of computation and memory space. Also, the second prior art approach is used to estimate the expected distortion for each macroblock based on encoder chosen motion vectors and coding modes, rather than for motion estimation and mode decision.

SUMMARY OF THE INVENTION

These and other drawbacks and disadvantages of the prior art are addressed by the present invention, which is directed to methods and apparatus for determining the expected distortion in decoded video blocks.

According to an aspect of the present principles, there is provided an apparatus. The apparatus includes a distortion calculator for calculating an expected distortion for an image block, included in a picture of a video sequence and sent over a lossy channel, using a motion vector for the image block when the motion vector has a non-integer value. The distortion calculator calculates the expected distortion based upon a propagated distortion of at least two neighboring integer pixel positions in a reference picture with respect to the motion vector having the non-integer value. The image block is coded in an inter mode or a SKIP mode.

According to another aspect of the present principles, there is provided a method. The method includes calculating an expected distortion for an image block, included in a picture of a video sequence and sent over a lossy channel, using a motion vector for the image block when the motion vector has a non-integer value. The calculating step calculates the expected distortion based upon a propagated distortion of at least two neighboring integer pixel positions in a reference picture with respect to the motion vector having the non-integer value. The image block is coded in an inter mode or a SKIP mode.

According to yet another aspect of the present principles, there is provided an apparatus. The apparatus includes a distortion calculator for calculating an expected distortion for an image block, included in a picture of a video sequence and sent over a lossy channel, when a deblocking filtering operation is applied to the image block. The distortion calculator calculates the expected distortion based upon a propagated distortion of at least two neighboring integer pixel positions in a reference picture with respect to pixel positions used in the deblocking filtering operation. The image block is coded in an inter mode or a SKIP mode.

According to a further aspect of the present principles, there is provided a method. The method includes calculating an expected distortion for an image block, included in a picture of a video sequence and sent over a lossy channel, when a deblocking filtering operation is applied to the image block. The calculating step calculates the expected distortion based upon a propagated distortion of at least two neighboring integer pixel positions in a reference picture with respect to pixel positions used in the deblocking filtering operation. The image block is coded in an inter mode or a SKIP mode.

According to a yet further aspect of the present principles, there is provided an apparatus. The apparatus includes an encoder for computing an expected distortion of an inter coded block, included in a picture of a video sequence and sent over a lossy channel, utilizing a deblocking filter operation and a motion vector of the inter coded block. The encoder calculates the expected distortion based upon an impact of distortion from pixel positions in neighboring blocks of the inter coded block that are used in the deblocking filter operation.

According to a still further aspect of the present principles, there is provided a method. The method includes computing an expected distortion of an inter coded block, included in a picture of a video sequence and sent over a lossy channel, utilizing a deblocking filter operation and a motion vector of the inter coded block. The encoder calculates the expected distortion based upon an impact of distortion from pixel positions in neighboring blocks of the inter coded block that are used in the deblocking filter operation.

According to an additional aspect of the present principles, there is provided an apparatus. The apparatus includes an encoder for calculating an expected distortion of a block, included in a picture of a video sequence and sent over a lossy channel. The encoder calculates the expected distortion based on a coding mode and motion vector for the block and using a decoder error concealment operation. The motion vector for the block has a non-integer value.

According to a further additional aspect of the present principles, there is provided a method. The method includes calculating an expected distortion of a block, included in a picture of a video sequence and sent over a lossy channel. The calculating step calculates the expected distortion based on a coding mode and motion vector for the block and using a decoder error concealment operation wherein the motion vector for the block has a non-integer value.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1A:
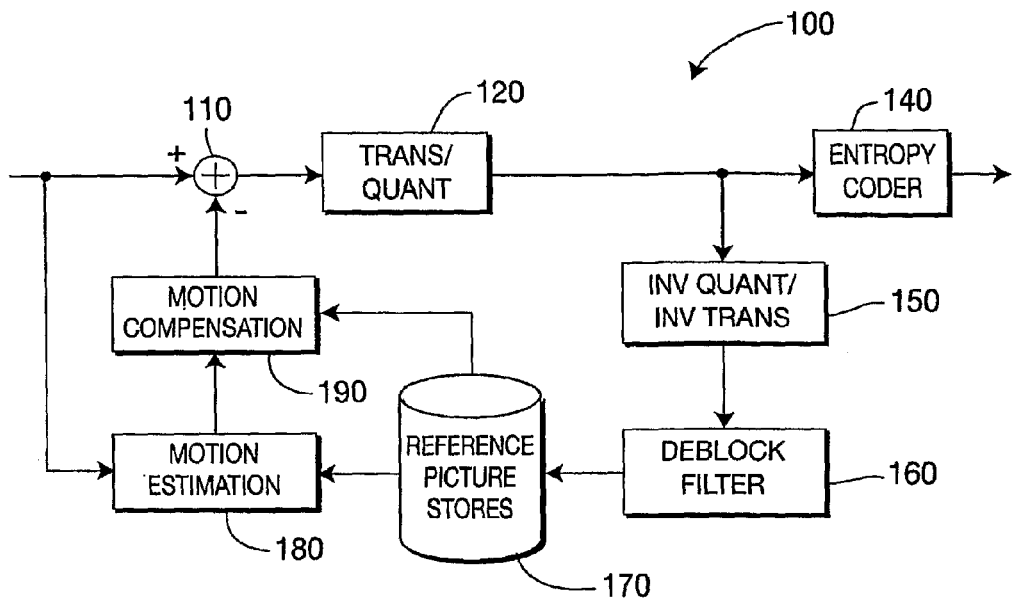
FIG. 1A is a block diagram for an exemplary video encoder to which the present principles may be applied, in accordance with an embodiment of the present principles.

The present principles are directed to methods and apparatus for determining the expected distortion in decoded video blocks. The expected distortion may be determined with respect to different candidate motion vectors and coding modes. Advantageously, various embodiments of the present principles may be implemented with respect to one or more of at least three different error concealment techniques that may be used at the decoder.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the) invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, neighboring integer pixel positions are the integer pixels positions closest to the non-integer position referred to be the non-integer valued motion vector.

Turning to FIG. 1A, an exemplary video encoder to which the present principles may be applied is indicated generally by the reference numeral 100.

An input to the video encoder 100 is connected in signal communication with a non-inverting input of a combiner 110. The output of the combiner 110 is connected in signal communication with a transformer/quantizer 120. The output of the transformer/quantizer 120 is connected in signal communication with an entropy coder 140. An output of the entropy coder 140 is available as an output of the encoder 100.

The output of the transformer/quantizer 120 is further connected in signal communication with an inverse transformer/quantizer 150. An output of the inverse transformer/quantizer 150 is connected in signal communication with an input of a deblock filter 160. An output of the deblock filter 160 is connected in signal communication with reference picture stores 170. A first output of the reference picture stores 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture stores 170 is connected in signal communication with a second input of the motion compensator 190. The output of the motion compensator 190 is connected in signal communication with an inverting input of the combiner 110.

Figure 1B:
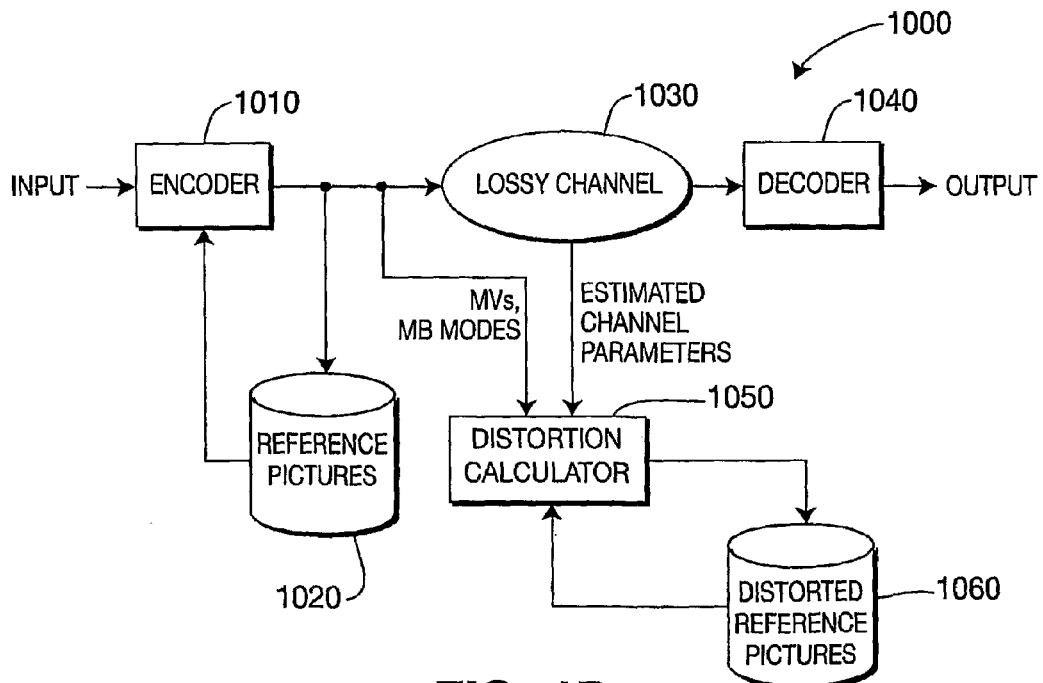
FIG. 1B is a block diagram for a video coding environment to which the present principles may be applied, in accordance with an embodiment of the present principles.

Turning to FIG. 1B, a video coding environment to which the present principles may be applied is indicated generally by the reference numeral 1000.

The video coding environment 1000 includes an encoder 1010 having an output connected in signal communication with a first input of a distortion calculator 1050, an input of a reference pictures store 1020, and an input to a lossy channel 1030. An output of the reference pictures store 1020 is connected in signal communication with a first input of an encoder 1010. A first output of the lossy channel is connected in signal communication with a second input of the distortion calculator 1050. An output of the distortion calculator is connected in signal communication with an input of a distorted reference pictures store 1060. An output of the reference pictures store 1060 is connected in signal communication with a third input of a distortion calculator 1050.

A second output of the lossy channel is connected in signal communication with an input of a decoder 1040. A second input of the encoder 1010 is available as an input to the video coding environment. An output of the decoder 1040 is available as an output of the video coding system 1000.

It is to be appreciated that while the distortion calculator 1050 is shown separate from the encoder 1010, in another embodiment, the distortion calculator 1050 may be included within the encoder 1050, while maintaining the spirit of the present principles. That is, given the teachings of the present principles provided herein, one of ordinary skill in this and related arts will contemplate these and various other configurations and modifications to the elements shown herein, while maintaining the spirit of the present principles.

In accordance with the present principles, methods and apparatus are provided for determining distortion in video blocks. In an embodiment, the expected distortion for a macroblock corresponding to a candidate coding mode and motion vector is estimated. Moreover, in an embodiment, the expected channel distortion for each macroblock for the final chosen coding mode is also estimated, which is used for computing the total distortion for macroblocks in the following frames. The expected total distortion for a new macroblock for a candidate coding mode and motion vector in a current frame is a weighted sum of the propagated channel distortion from the reference frame used for motion compensation and the concealment distortion for this macroblock should this macroblock alone be lost.

Exemplary embodiments respectively directed to three variations of the estimation methods are described, for the following three types of error concealment methods: frame copy; using motion vectors of the current frame; and using motion vectors of co-located macroblocks in the previous frame. Embodiments of the present principles may be used when the encoder uses sub-pel motion vectors. Moreover, embodiments of the present principles may be used when multiple reference frames are used. Further, embodiments of the present principles may be used when deblocking filtering is used. Also, embodiments of the present principles may be used when the decoder employs different types of error concealment methods. Embodiments of the present principles do not require the tracking of channel distortion at every pixel and, hence, are substantially simpler than the ROPE method. Moreover, embodiments of the present principles require less computation and memory space than the above-mentioned second prior art approach. As noted above, various embodiments as well as various aspects of the various embodiments may be readily combined, as is readily determined by one of ordinary skill in this and related arts, while maintaining the scope of the present principles.

For the sakes of illustration and clarity, a description will now be provided of some of the notations and presumptions used herein, as well as an overview of various embodiments of the present principles.

We use $f_n^i$ to denote the original value for pixel i in frame n, $\hat{f}_n^i$ to denote the reconstructed value at the encoder, and $\tilde{f}_n^i$ to denote the reconstructed value at the decoder. The expected total distortion at the decoder for the j-th macroblock in frame n is defined as $$D_n^j = \frac{1}{N} \sum_{i \in MB_j} E\{(f_n^i - \tilde{f}_n^i)^2\},$$

where the expectation operator $\{.\}$ is taken over all possible packet loss realizations for a given packet loss rate. The quantization distortion is defined as $$D_{q,n}^j = \frac{1}{N} \sum_{i \in MB_j} (f_n^i - \hat{f}_n^i)^2,$$

which can be computed at the encoder exactly for any chosen coding mode and motion vectors. The expected channel distortion is defined as $$D_{c,n}^j = \frac{1}{N} \sum_{i \in MB_j} E\{(\hat{f}_n^i - \tilde{f}_n^i)^2\}.$$

In some of the equations presented below, we make use of the presumption that $D_n^j = D_{q,n}^j + D_{c,n}^j$.

We presume that each macroblock in a P-frame has a loss rate P, which is equal to the packet loss rate if each packet includes an entire frame or a fixed number of macroblocks.

In rate-distortion optimized motion estimation and mode decision, motion vectors (including the reference frame indices if multiple reference frames are allowed) and the coding modes are determined by minimizing a Lagrangian cost function as follows:

$$L(o) = D_n^j(o) + \lambda R_n^j(o) \qquad (1)$$

where o represents a candidate coding option (including the coding mode and the candidate reference frame index and motion vectors for an inter mode), $D_n^j(o)$ represents the expected total distortion for macroblock j in frame n using coding option o, and $R_n^j(o)$ is the total number of bits needed to code this macroblock using option o. For each candidate inter mode, the expected distortions $D_n^j(o)$ and consequently the Lagrangian costs corresponding to all possible reference frame indices and motion vectors are first determined, and the best reference frame indices and motion vectors having the least Lagrangian cost are chosen. The expected distortions and the Lagrangian costs for all possible intra modes and SKIP mode are also computed. Finally, the coding mode with the least Lagrangian cost is chosen.

When the loss rate for a macroblock is P, the expected distortion $D_n^j(o)$ can generally be computed as follows:

$$D_n^j(o) = (1-P)D_{R,n}^j(o) + PD_{L,n}^j(o) \qquad (2)$$

The term $D_{R,n}^j(o)$ represents the distortion when the macroblock is received, which depends on the coding option. The term $D_{L,n}^j(o)$ denotes the distortion when the macroblock is lost, which depends on the assumed error concealment method and the coding option. In accordance with various embodiments of the present principles, methods are provided for determining $D_{R,n}^j(o)$ for the inter mode and SKIP mode, and for determining $D_{L,n}^j(o)$ when error concealment uses motion-compensated prediction.

The computation of $D_{R,n}^j(o)$ for the intra mode is known in the prior art, as well as the computation of $D_{L,n}^j(o)$ when error concealment uses frame copy. However, for completeness, we also describe their computations herein.

For illustrative purposes, we consider the following three different error concealment methods: frame copy (also referred to herein as "EC1"); using motion vectors of the current frame (also referred to herein as "EC2"); and using motion vectors of co-located macroblocks in the previous frame (also referred to herein as "EC3"). With EC2, the coding mode and motion vectors chosen for a macroblock will affect the distortion when this macroblock is lost. For rate-distortion optimized motion estimation and mode decision, we will use the Lagrangian cost in Equation (1) with the total expected distortion for this macroblock $D_n^j(o)$ computed using Equation (2).

Herein, we present methods for estimating the expected distortion $D_{R,n}^j(o)$ corresponding to different candidate coding options. Thereafter, we present methods for estimating the expected distortion $D_{L,n}^j(o)$ for error concealment methods EC1 and EC2.

With EC3, the coding mode and motion vectors chosen for a macroblock will affect the distortion when the co-located macroblock in frame n+1 is lost. For rate-distortion optimized motion estimation and mode decision, we propose to use a different Lagrangian cost as follows:

$$L(o) = D_{n,n+1}^j(o) + \lambda R_n^j(o) \quad (3)$$

with $$D_{n,n+1}^j(o) = (1-P)D_{R,n}^j(o) + PD_{L,n}^j(o) \quad (4)$$

The term $D_{R,n}^j(o)$ can still be computed as described below for various coding modes. The term $D_{L,n+1}^j(o)$ is the expected distortion for the co-located macroblock in frame n+1, using the reference frame index and motion vector derived from the coding option o. The computation of $D_{L,n+1}^j(o)$ and $D_{n,n+1}^j(o)$ is described herein below.

Herein below, with respect to an embodiment, we present a rate-constrained motion estimation method for a given inter mode. A new Lagrangian cost function is introduced, which takes channel distortion into account. In accordance with various embodiments, methods are provided for computing terms in this new cost function for different error concealment methods. Motion estimation based on this new measure requires less computation than the rate-distortion optimized motion estimation also described herein.

In some of the methods presented herein, it is presumed that the expected channel distortion for each macroblock is determined from the past M frames, where M is the maximum temporal prediction distance used by the encoder. However, in an embodiment, we present a method for determining the expected channel distortion for any macroblock in a currently coded frame based on the final chosen motion vectors and coding mode.

The present principles presume that intra prediction in an intra mode makes use of only previously coded pixels in intra-coded macroblocks. This is known as constrained intra prediction in the MPEG-4 AVC standard. The notation provided herein in accordance with the present principles considers the coding option decision and error concealment for P-frames only, in which a maroblock is predicted from one previously coded frame, chosen out of M previously coded frames. For notation convenience, we presume the P-frames are ordered consecutively, i.e., if frame n is a P-frame, then the next P-frame is n+1. However, the method in accordance with this embodiment can be extended to consider mode decision in I-frames (in which all macroblocks are coded by one of the intra modes) and B-frames (in which bidirectional prediction modes can be used in addition to intra, inter, and SKIP modes).

Methods for Computing Expected Distortion for a Received Macroblock for Different Candidate Modes Descriptions will now be given regarding various methods in accordance with various embodiments of the present principles for computing the expected distortion for a received macroblock for different candidate coding modes. More specifically, various methods are described for computing $D_{R,n}^j(o)$ in Equation (2), the expected distortion when a macroblock is received, for different coding modes.

Figure 2:
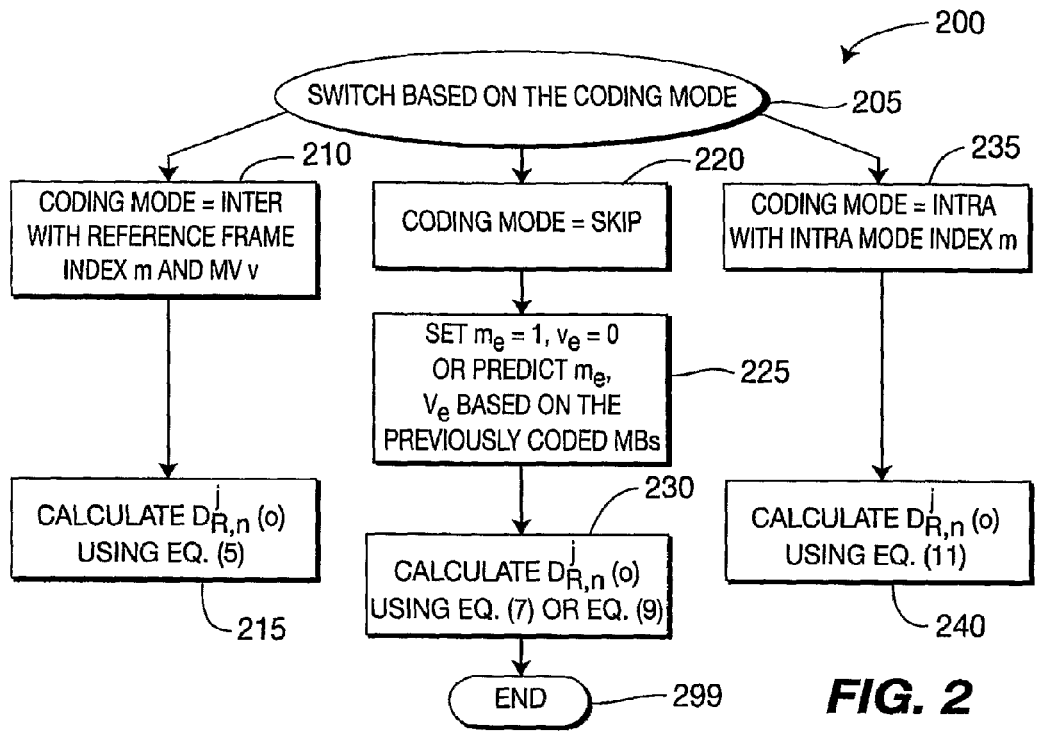
FIG. 2 is a flow diagram for an exemplary method for determining $D_{R,n}{}^j(o)$ for a given coding option, in accordance with an embodiment of the present principles.

Turning to FIG. 2, an exemplary method for determining $D_{R,n}^j(o)$ for a given coding option is indicated generally by the reference numeral 200.

The method 200 includes a function block 205. The function block 205 performs a switch based on the coding mode, and passes control to a function block 210, a function block 220, and a function block 235.

The function block 210 sets the coding mode equal to INTER with reference frame index m and motion vector (MV) v, and passes control to a function block 215.

The function block 215 calculates $D_{R,n}^j(o)$ using Equation (5), and passes control to an end block 299.

The function block 220 sets the coding mode equal to SKIP mode, and passes control to a function block 225. The function block 225 sets $m_e=1$, $v_e=0$ or predicts $m_e,v_e$ based on the previously coded macroblocks (MBs), and passes control to a function block 230. The function block 230 calculates $D_{R,n}^j(o)$ using Equation (7) or Equation (9), and passes control to the end block 299.

The function block 235 sets the coding mode equal to INTRA with intra mode index m, and passes control to a function block 240. The function block 240 calculates $D_{R,n}^j(o)$ using Equation (11), and passes control to the end block 299.

Inter Mode

With respect to providing methods for computing the expected distortion for a received macroblock for different candidate coding modes, we first consider an inter-prediction mode, where only a single motion vector (MV) is used for the entire macroblock. In general, the reference frame can be chosen from any of the previous M frames. For a candidate reference frame index m ($1 \leq m \leq M$) and a candidate motion vector v, the distortion is computed as follows:

$$D_{R,n}^j(P, m, v) = D_{q,n}^j(P, m, v) + aD_{c,n-m}^{r(j,v)} \quad (5)$$

where $$D_{q,n}^j(P, m, v) = \frac{1}{N} \sum_{i \in MB_j} (f_n^i - \hat{f}_n^i)^2 \quad (6)$$

is the mean squared quantization error for macroblock j using the candidate reference frame index m and motion vector v.

The term $D_{c,n-m}^{r(j,v)}$ denotes the expected average channel distortion in the motion-compensation block in frame n-m, indexed by r(j,v), for macroblock j in frame n. Recall that we presume that the respective average channel distortion in L each macroblock in the previous M frames have been determined previously and recorded. That is, we presume $D_{c,n-m}^j$ is available for all m and j. Generally, the block r(j,v) may not be aligned with the regular macroblock boundaries, and may overlap with up to 4 macroblocks in frame n-m. We determine $D_{c,n-m}^{r(j,v)}$ by a weighted average of the respective channel distortions in the overlapped macroblocks, where the weights are proportional to the overlap areas.

The term $aD_{c,n-m}^{r(j,v)}$ in Equation (5) denotes the propagated distortion from frame n-m when macroblock j is received. This method of accounting for the temporal error propagation in inter-coded macroblocks differs from the prior art and provides an advantageous feature over the prior art. The coefficient a is an attenuation factor that accounts for the decaying of error propagation due to deblocking filtering and the interpolation operation when a sub-pel motion vector is used. Mathematically, a depends on the actual deblocking filters applied for this block, the candidate motion vector (which determines the number of pixels used for interpolation and the interpolation filter), and the correlation between the channel induced errors in neighboring pixels involved in motion compensation and deblocking filtering. In the special case when the candidate motion vector is an integer vector, a=1. More generally, the value of a is in the range of (0 to 1). The specific definition of a and the use of $aD_{c,n-m}^{r(j,v)}$ to compute the propagated distortion for received inter-coded macroblocks is an extension of a prior art approach. We also extend the prior art method for estimating the parameter a based on training data. As one difference with respect to the prior art which required full-pel positions, in an embodiment of the present principles, we can use a pre-estimated value for a for all candidate motion vectors that have sub-pel accuracy. Moreover, unlike the prior art, we may use a deblocking filter in such situations.

To consider an inter mode that divides a macroblock into multiple smaller subblocks, each with a separate motion vector associated with a corresponding reference frame, we just need to calculate the distortion $D_{R,n}^j(P,m,v)$ for each sub-block for the corresponding candidate reference frame index and motion vector using Equation (5), and then compute the average over all sub-blocks.

Skip Mode

With respect to providing methods for computing the expected distortion for a received macroblock for different candidate coding modes, we now consider SKIP mode. In SKIP mode, the encoder either presumes the motion vector is zero or predicts the motion vector based on the motion vector of selected previously coded macroblocks, and computes the prediction error signal but does not code the prediction error signal. The reconstructed block by the encoder is simply the co-located macroblock in the previous frame (if the encoder assumes the motion vector is zero) or the motion compensation block based on the predicted motion vector. The distortion when the macroblock is received is the prediction error plus the propagated channel error from the reference frame. Here we presume that with SKIP mode, the encoder can predict the reference frame index as well as the motion vector, but only a single motion vector is used for the entire macroblock. It is to be noted that with the MPEG-4 AVC standard, only the previous frame is allowed as the reference frame, which is a special case considered here in accordance with an embodiment of the present principles. Let $m_e$ and $v_e$ denote the encoder predicted reference frame index and motion vector (which is a function of the reference frame indices and motion vectors chosen for previous neighboring macroblocks). The expected distortion is as follows:

$$D_{R,n}^j(S;m_e,v_e) = D_{DFD,n}^j(m_e,v_e) + aD_{c,n-m_e}^{r(j,v_e)} \qquad (7)$$

The term $D_{DFD,n}^j(m,v)$ represents the mean of the displaced frame difference (DFD) square between the original pixels in the current macroblock and their predicted values from encoded frame n-m based on the motion vector v, and is computed as follows:

$$D_{DFD,n}^j(m,v) = \frac{1}{N} \sum_{i \in MB_j} \left(f_n^i - \hat{f}_{n,p}^i(m,v)\right)^2 \qquad (8)$$

with $\hat{f}_{n,p}^i(m,v)$ denoting the predicted value for pixel i in frame n, which is computed by the encoder from the previously encoded frame n-m using motion vector v.

In the special case of $m_e=1$, $v_e=0$, $D_{DFD,n}^j(m_e,v_e)=D_{FD,n}^j$, $D_{c,n-m_e}^{r(j,v_e)}=D_{c,n-1}^j$, so that $$D_{R,n}^j(S;m_e=1,v_e=0) = D_{FD,n}^j + D_{c,n-1}^j \qquad (9)$$

The term $D_{FD,n}^j$ represents the mean of the frame difference (FD) square between the original pixels in the current macroblock and the encoded values of the co-located pixels in frame n−1, computed as follows:

$$D_{FD,n}^j = \frac{1}{N} \sum_{i \in MB_j} \left(f_n^i - \hat{f}_{n-1}^i\right)^2 \qquad (10)$$

Intra Mode

With respect to providing methods for computing the expected distortion for a received macroblock for different candidate coding modes, we now consider intra mode. An intra mode may code a block directly or use one type of intra-prediction pattern. In the latter case, we only consider constrained intra prediction, by which only the previously coded pixels in intra-coded macroblocks are used for intra prediction. The expected distortion for an intra mode when the macroblock is received is equal to the quantization distortion as follows:

$$D_{R,n}^j(I,m) = D_{q,n}^j(I,m) \qquad (11)$$

where $D_{q,n}^j(I,m)$ can be computed using Equation (6) with $\hat{f}_n^i$ denoting the reconstructed values using the intra mode (I,m).

Methods for Computing Expected Distortion for a Lost Macroblock Using Error Concealment Methods EC and EC2

We now describe the methods for estimating the expected distortion $D_{L,n}^j(o)$ in Equation (2) for a lost macroblock for error concealment methods EC1 and EC2 in accordance with various embodiments of the present principles.

Frame Copy (EC1)

With respect to providing methods for computing the expected distortion for a lost macroblock using error concealment methods EC1 and EC2, we first consider the case when the decoder copies the co-located macroblock in the previous frame for error concealment for all lost macroblocks. We denote this case as EC1.

In this case, the distortion is the same regardless of the coding mode. The distortion is computed as follows:

$$D_{EC1,n}^j = D_{FD,n}^j + D_{c,n-1}^j. \qquad (12)$$

Using Encoder Coding Modes and Motion Vectors (EC2)

With respect to providing methods for computing the expected distortion for a lost macroblock using error concealment methods EC1 and EC2, we now the case of using encoder coding modes and motion vectors, which is referred to herein as EC2. In this case, we presume that the coding mode and motion vector information of a macroblock is coded and transported in such a way so that they are available even if the texture information (DCT coefficients of intra- and inter-prediction errors) is lost. For example, the encoder may include the coding mode and motion vector information in a redundant slice, or in a separate data partition, to realize such unequal protection. In this case, if the texture information is lost, the decoder will perform motion compensated error concealment using the encoder coding modes and the corresponding reference frame indices and motion vectors. When a macroblock is coded using an intra mode or SKIP mode, the decoder can perform error concealment either presuming the motion vector is zero (equivalent to frame copy) or using a predicted motion vector based on the motion vectors of previously coded macroblocks. The encoder can produce the same predicted motion vector for these macroblocks and, hence, can estimate accurately the concealment distortion with either option. We refer to this error concealment method as EC2.

Figure 3:
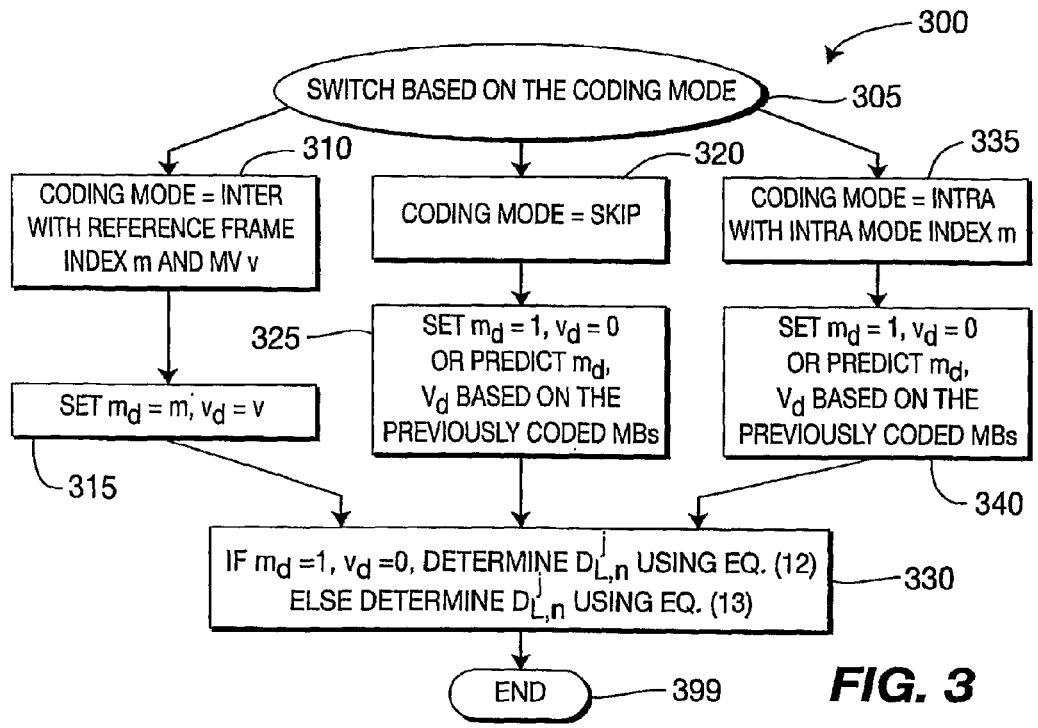
FIG. 3 is a flow diagram for a method for determining $D_{L,n}{}^j(o)$ for a given coding option when the decoder uses error concealment method EC2, in accordance with an embodiment of the present principles.

Turning to FIG. 3, a method for determining $D_{L,n}^{j}(o)$ for a given coding option when the decoder uses error concealment method EC2 is indicated generally by the reference numeral 300. The method 300 includes a function block 305. The function block 305 performs a switch based on the coding mode, and passes control to a function block 310, a function block 320, and a function block 335.

The function block 310 sets the coding mode equal to INTER with reference frame index m and motion vector (MV) v, and passes control to a function block 315.

The function block 315 sets $m_d$=m, $v_d$=v, and passes control to a function block 330.

The function block 330 determines $D_{L,n}^{j}(o)$ using Equation (12) when $m_d$=1 and $v_d$=0 or determines $D_{L,n}^{j}(o)$ using Equation (13) otherwise, and passes control to an end block 399.

The function block 320 sets the coding mode equal to SKIP mode, and passes control to a function block 325. The function block 325 sets $m_d$=1, $v_d$=0 or predicts $m_d$, $v_d$ based on the previously coded macroblocks (MBs), and passes control to the function block 330.

The function block 335 sets the coding mode equal to INTRA with intra mode index m, and passes control to a function block 340. The function block 340 sets $m_d$=1, $v_d$=0 or predicts $m_d$, $v_d$ based on the previously coded macroblocks (MBs), and passes control to the function block 330.

With either coding mode, let the reference frame index and motion vector used as the decoder be denoted by $m_d$ and $v_d$, the distortion of the concealed macroblock can be computed as follows:

$$D_{EC2,n}^{j}(m_d, v_d) = D_{DFD,n}^{j}(m_d, v_d) + aD_{c,n-m_d}^{r(j,v_d)}. \qquad (13)$$

The terms $D_{DFD,n}^{j}(m,v)$ and $D_{c,n-m}^{r(j,v)}$ are computed as described above.

With an inter mode, the reference frame index and motion vector used at the decoder, $m_d$ and $v_d$, equal those used at the encoder. For the intra and SKIP mode, if the decoder predicts the reference frame index and motion vector based on the previously decoded macroblocks, then $m_d$ and $v_d$ equal to the encoder predicted reference frame index and motion vector based on previously encoded macroblocks. If the decoder uses frame copy for error concealment, then $m_d$=1 and $v_d$=0. In this case, Equation (13) reduces to Equation (12).

Methods for Computing Expected Distortion Using Error Concealment Method that Copies the Coding Modes and Motion Vectors for the Previous Frame (EC3)

In applications where mode information and motion vectors are not protected differently from the texture data, the decoder must estimate the motion vector for a lost macroblock for temporal error concealment. One simple approach for concealing lost macroblocks is to use the motion vector of the co-located macroblock in the previous frame. If the co-located macroblock in frame n uses a reference frame that is m frames away, temporal concealment for the same macroblock in frame n+1 is based on frame n+1-m. If the co-located macroblock in the previous frame is coded using an intra mode or SKIP mode, error concealment may either assume the motion vector is zero or predict the motion vector based on the recovered motion vectors of previously decoded inter-coded macroblocks in frame n+1. In either case, the encoder can produce the same predicted motion vector for these macroblocks and, hence, can estimate accurately the concealment distortion with either option. We refer to this error concealment method as EC3. Since the coding mode and motion vector chosen for a current macroblock will affect the concealment distortion of the co-located macroblock in the following frame, we modify the conventional Lagrangian cost function in Equation (1) to that in Equation (3), which involves the computation of $D_{R,n}^{j}(o)$ and $D_{L,n+1}^{j}(o)$ as defined in Equation (4). The term $D_{R,n}^{j}(o)$ can still be computed as described above for various coding modes.

Figure 4:
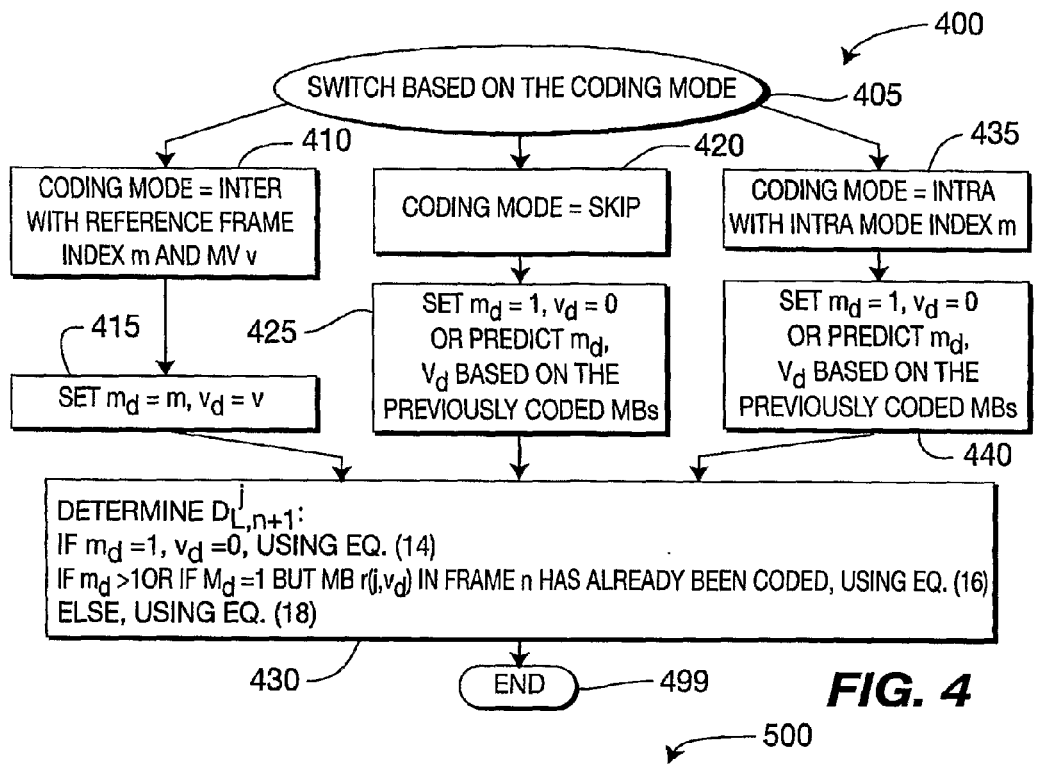
FIG. 4 is a flow diagram for an exemplary method for determining $D_{L,n+1}{}^j(o)$ for a given candidate coding option when the decoder uses error concealment method EC3, in accordance with an embodiment of the present principles.

Turning to FIG. 4, an exemplary method for determining $D_{L,n+1}^{j}(o)$ for a given candidate coding option when the decoder uses error concealment method EC3 is indicated generally by the reference numeral 400. The method 400 includes a function block 405. The function block 405 performs a switch based on the coding mode, and passes control to a function block 410, a function block 420, and a function block 435.

The function block 410 sets the coding mode equal to INTER with reference frame index m and motion vector (MV) v, and passes control to a function block 415.

The function block 415 sets $m_d$=m, $v_d$=v, and passes control to a function block 430.

The function block 430 determines $D_{L,n+1}^{j}(o)$ using Equation (14) when $m_d$=1 and $v_d$=0 or determines $D_{L,n+1}^{j}(o)$ using Equation (16) when $m_d$>1 or $m_d$=1 but MB $r(j,v_d)$ in frame n has already been coded or determines $D_{L,n}^{j}(o)$ using Equation (18) otherwise, and passes control to an end block 499.

The function block 420 sets the coding mode equal to SKIP mode, and passes control to a function block 425. The function block 425 sets $M_d$=1, $V_d$=0 or predicts $m_d$, $v_d$ based on the previously coded macroblocks (MBs), and passes control to the function block 430.

The function block 435 sets the coding mode equal to INTRA with intra mode index m, and passes control to a function block 440. The function block 440 sets $m_d$=1, $v_d$=0 or predicts $m_d$, $v_d$ based on the previously coded macroblocks (MBs), and passes control to the function block 430.

Estimation of the Distortion of the Concealed Macroblock

Let $m_d$ and $v_d$ denote the reference frame index and motion vector used as the decoder for this macroblock, which can be derived by the encoder based on the candidate coding mode, reference frame index and motion vector for macroblock j in frame n. We will use $D_{L,n+1}^{j}(m_d, v_d)$ to denote $D_{L,n+1}^{j}(o)$.

Depending on the value of $m_d$ and $v_d$, $D_{L,n+1}^{j}(m_d,v_d)$ can be computed, for example, in the following described three exemplary ways.

If $m_d$=1 and $v_d$=0, then $$D_{L,n+1}^{j}(1, 0) = D_{FD,n+1}^{j} + D_{c,n}^{j} \qquad (14)$$

with $$D_{FD,n+1}^{j} = \frac{1}{N} \sum_{i \in MB_j} (f_{n+1}^{i} - \hat{f}_{n}^{i})^2 \qquad (15)$$

where $\hat{f}_n^{i}$ denotes the encoder reconstructed value for pixels in macroblock j and frame n using the current candidate mode and motion vectors. Note that this case applies to the intra and SKIP mode if the decoder chooses to use frame copy for concealment of such blocks.

If $m_d>1$ or if $m_d=1$ but macroblock $r(j,v_d)$ in frame n has already been coded, then $$D_{L,n+1}^j(m_d, v_d) = D_{DFD,n+1}^j(m_d, v_d) + aD_{c,n+1-m_d}^{r(j,v_d)}. \quad (16)$$

with $$D_{DFD,n+1}^j(m, v) = \frac{1}{N} \sum_{i \in MB_j} (f_{n+1}^i - \hat{f}_{n+1,p}^i(m, v))^2 \quad (17)$$

where $\hat{f}_{n+1}p^i(m,v)$ denotes the predicted value for pixel i in frame n+1 from the encoded pixels in frame n+1-m assuming the motion vector is v.

If $m_d=1$ and macroblock $r(j,v_d)$ in frame n has not been coded, then the distortion is calculated as follows:

$$D_{L,n+1}^j(1,v_d) = \overline{D}_{DFD,n+1}^j(1,v_d) + a_q D_{q,n}^{r(j,v_d)} + aD_{c,n}^{r(j,v_d)}. \quad (18)$$

The term $\overline{D}_{DFD,n+1}^j(1,v)$ is computed as follows:

$$\overline{D}_{DFD,n+1}^j(m, v) = \frac{1}{N} \sum_{i \in MB_j} (f_{n+1}^i - f_{n+1,p}^i(m, v))^2 \quad (19)$$

where $f_{n+1}p^i(m,v)$ denotes the predicted value for pixel i in frame n+1 from the original pixels in frame n+1-m assuming the motion vector is v.

The constant $a_q$ is a parameter that can be pre-estimated in the same way as for a, and generally $a_q \leq a$. When the candidate motion vector is an integer vector, $a_q=a=1$.

The terms $D_{q,n}^{r(j,v)}$ and $D_{c,n}^{r(j,v)}$ are the quantization distortion and the expected channel distortion for block r(j,v) in frame n, which has not been coded yet. How to estimate these two terms is described herein below.

Estimation of the Quantization and Channel Distortion for a Macroblock Before Coding this Macroblock To determine $D_{q,n}^{r(j,v)}$ in Equation (18) when block r(j,v) is not yet coded, we can use the average quantization distortion for previously coded macroblocks in this frame or the previous frame. Alternatively, we can use the average quantization distortion determined based on the quantization step size used for this frame.

To determine $D_{c,n}^{r(j,v)}$ in Equation (18) when block r(j,v) is not yet coded, we can use the average of the $D_{c,n}^j$ calculated for previously coded MBs in this frame. Alternatively, we can use, for example, a prior art frame-level channel distortion model to compute the average channel distortion for frame n, and use the average channel distortion to approximate the channel distortion for any un-coded macroblock. More specifically, let $\beta_n$ denote the average intra rate (the percentage of macroblocks coded in an intra mode) in frame n, the average channel distortion can be computed recursively using the following:

$$D_{c,n} = PD_{ECP,n} + ((1-P)(1-\beta_n)a + Ph)D_{c,n-1} \quad (20)$$

where h is a factor similar to a, but depends on the distribution of motion vectors used for error concealment. With EC3, error concealment uses the same set of motion vectors as the encoder does so that one can set h=a. To estimate the intra rate $\beta_n$ before coding this frame, one can average intra rates used in previously coded frames. The term $D_{ECP,n}$ represents the average concealment distortion for frame n, in the absence of channel induced errors in previous frames. With EC3, if for the co-located macroblock j in frame n−1, the final chosen reference frame index is $m_{n-1}^j$, and the Chosen motion vector is $v_{n-1}^j$, the concealment distortion for macroblock j is $D_{ECP,n}^j = D_{DFD,n}^j(m_{n-1}^j, v_{n-1}^j) - D_{q,n}^j$, where $D_{q,n}^j$ can be computed as described above, and $D_{DFD,n}^j(m_{n-1}^j, v_{n-1}^j)$ can be computed using Equation (8). The distortion $D_{ECP,n}$ is the average of $D_{ECP,n}^j$ for all macroblocks.

Rate-Constrained Motion Estimation Considering Chanel Distortion

To compute the rate term $R_n^j(o)$ in the Lagrangian cost, the encoder needs to quantize and code the prediction error corresponding to each candidate mode and motion vector, so as to determine the rate required for representing the motion vector and the prediction error. In order to reduce the computation, we can use a cost function that does not require the knowledge of the rate needed to code the prediction error, but only the rate for representing the mode and motion vector. This) is generally known as rate-constrained motion estimation. It is to be appreciated that the prior art in this area considered only quantization distortion. To consider channel distortion, we modify the Lagrangian cost to the following:

$$L_{MV}(m,v) = D_{DFD,n}^j(m,v) + \lambda_{MV}R_v(m,v) + \lambda_C((1-P)aD_{c,n-m}^{r(j,v)} + PD_{L,n}^j(m,v)) \quad (21)$$

where $\lambda_{MV}$ and $\lambda_C$ are suitably chosen values for a total rate constraint or quantization parameter (QP). The term $D_{DFD,n}^j(m,v)$ is as defined in Equation (8), and $R_v(m,v)$ is the total number of bits needed to code the reference frame index m and the motion vector v.

With EC1 and EC2, the term $D_{L,n}^j(m,v)$ is the expected distortion when macroblock j in frame n is lost and concealed. This term can be computed using Equation (12) with EC1, and using Equation (13) with EC2.

With EC3, $D_{L,n}^j(m,v)$ is replaced by $D_{L,n+1}^j(m,v)$, computed using either Equation (14) or Equation (16) or Equation (18) depending on the candidate values for m and v.

Channel Distortion Estimation for the Chosen Mode and Motion Vectors

The methods presented herein before have assumed that the expected channel distortions for all macroblocks in up to M previous frames are known. Here, we consider how to compute the expected channel distortion for a macroblock once its final coding mode and motion vectors are chosen. This computation is done at the end of the motion estimation and mode decision process when coding each macroblock in frame n.

Let the final coding option for macroblock j (including the coding mode and the reference frame indices and motion vectors if it is an inter mode) be denoted by o*. If the expected total distortion corresponding to this coding option is $D_n^j(o^*)$, and the quantization distortion is $D_{q,n}^j(o^*)$, the expected channel distortion for this macroblock is as follows:

$$D_{c,n}^j(o^*) = D_n^j(o^*) - D_{q,n}^j(o^*). \quad (22)$$

For EC1 and EC2, based on the $D_{R,n}^j(o)$ and $D_{L,n}^j(o)$ computed for various coding modes, one can derive the total expected distortion $D_n^j(o)$ using Equation (2) for all possible coding options, including o*. Similarly, $D_{q,n}^j(o)$ has been computed for various coding modes. For SKIP mode, $D_{q,n}^j(o) = D_{DFD,n}^j(S; m_e, v_e)$. Therefore, Equation (22) can be used directly to compute the channel distortion.

For EC3, we have only calculated $D_{L,n+1}^j(o)$, the expected distortion for macroblock j in frame n+1 if it is lost, for various coding options. To determine $D_n^j(o^*)$, we also need to compute $D_{L,n}^j(o_{n-1}^j)$, where $o_{n-1}^j$ denotes the coding option chosen for macroblock j in frame n−1, because concealment of the current macroblock depends on $o_{n-1}^j$. Generally, based on $o_{n-1}^j$, one can derive the reference frame index $m_d$ and motion vector $v_d$ to be used by the decoder for error concealment for macroblock j in frame n. The distortion when this macroblock is lost and concealed can be computed using the following:

$$D_{L,n}^j(o_{n-1}^j) = D_{L,n}^j(m_d, v_d) = D_{DFD,n}^j(m_d, v_d) + aD_{c,n-m_d}^{r(j,v_d)}.$$

If for intra and SKIP modes, the decoder error concealment uses frame copy, then the above equation is simplified to Equation (12).

The total expected distortion $D_n^j(o^*)$ can then be determined from the previously calculated $D_{R,n}^j(o^*)$ and the newly computed $D_{L,n}^j(o_{n-}^j)$ using Equation (2).

Figure 5:
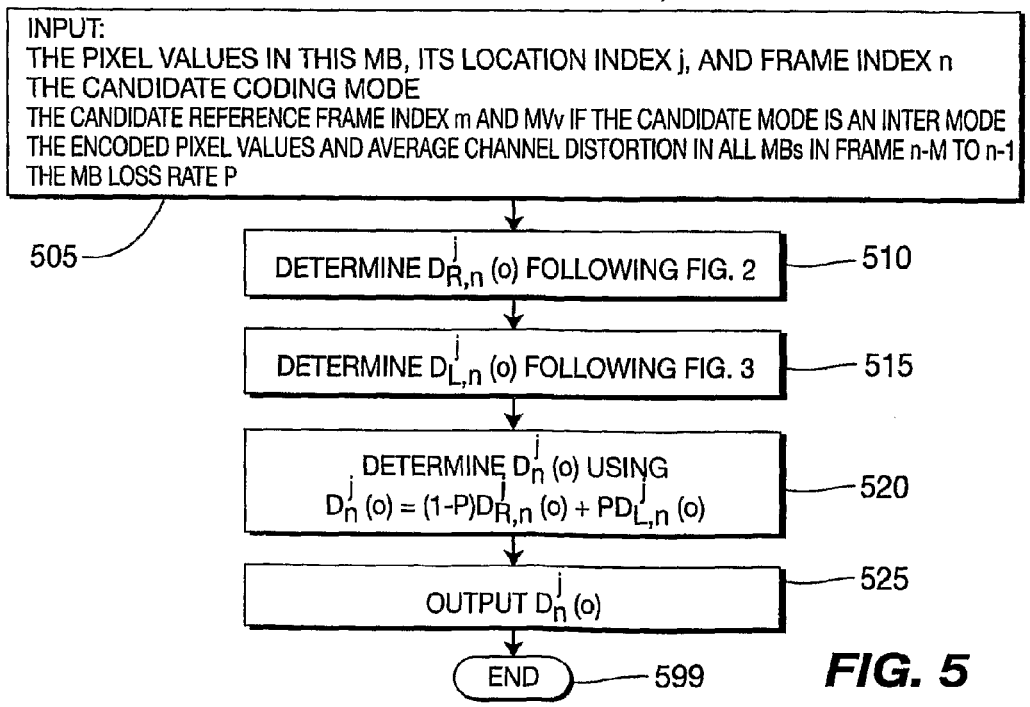
FIG. 5 is a flow diagram for an exemplary method for determining the total expected distortion $D_n{}^j(o)$ in the Lagrangian cost for a given macroblock (MB) for rate-distortion optimized motion estimation and mode decision, when the decoder uses error concealment method EC2, in accordance with an embodiment of the present principles.

Turning to FIG. 5, an exemplary method for determining the total expected distortion $D_n^j(o)$ in the Lagrangian cost for a given macroblock (MB) for rate-distortion optimized motion estimation and mode decision, when the decoder uses error concealment method EC2 is indicated generally by the reference numeral 500. The method 500 includes a function block 505. The function block 505 inputs pixel values in the macroblock, its location index j, and frame index n, the candidate coding mode, the candidate reference frame index m and motion vector (MV) v if the candidate mode is an INTER mode, the encoded pixel values and average channel distortion in all macroblocks (MBs) in frame n-M to n-1, the macroblock loss rate P, and passes control to a function block 510. The function block 510 determines $D_{R,n}^j(o)$ (e.g., as described with respect to FIG. 2), and passes control to a function block 515. The function block 515 determines $D_{L,n}^j(o)$ (e.g., as described with respect to FIG. 3), and passes control to a function block 520. The function block 520 determines $D_n^j(o)$ using $D_n^j(o) = (1-P)D_{R,n}^j(o) + PD_{L,n}^j(o)$, and passes control to a function block 525. The function block 525 outputs $D_n^j(o)$, and passes control to an end block 599.

Figure 6:
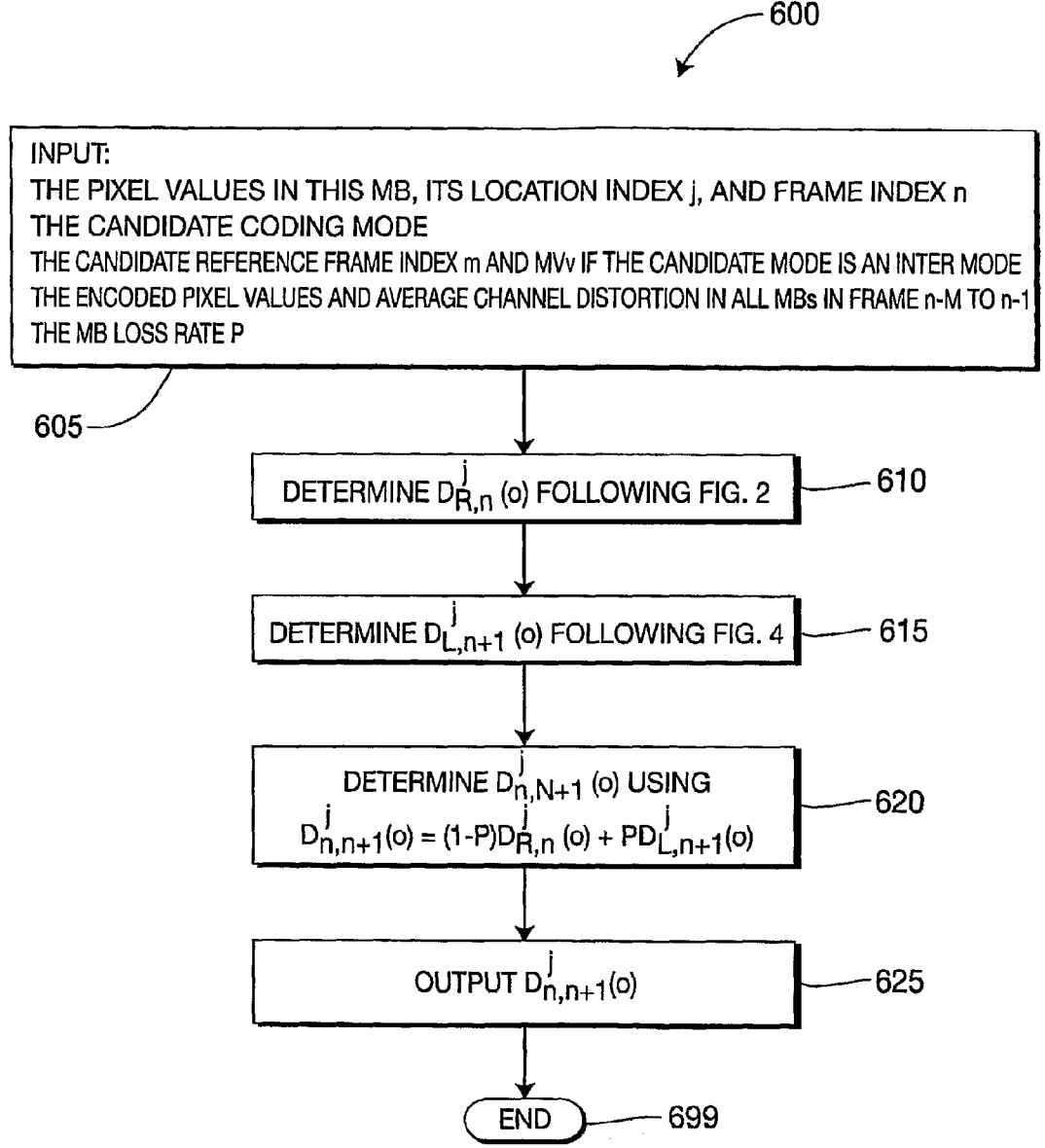
FIG. 6 is a flow diagram for an exemplary method for determining $D_{n,n+1}{}^j(o)$ in the Langrangian cost for a given macroblock (MB) for rate-distortion optimized motion estimation and mode decision when the decoder uses error concealment method EC3, in accordance with an embodiment of the present principles.

Turning to FIG. 6, an exemplary method for determining $D_{n,n+1}^j(o)$ in the Langrangian cost for a given macroblock (MB) for rate-distortion optimized motion estimation and mode decision when the decoder uses error concealment method EC3 is indicated generally by the reference numeral 600. The method 600 includes a function block 605. The function block 605 inputs pixel values in the macroblock, its location index j, and frame index n, the candidate coding mode, the candidate reference frame index m and motion vector (MV) v if the candidate mode is an INTER mode, the encoded pixel values and average channel distortion in all macroblocks (MBs) in frame n-M to n-1, the macroblock loss rate P, and passes control to a function block 610. The function block 610 determines $D_{R,n}^j(o)$ (e.g., as described with respect to FIG. 2), and passes control to a function block 615. The function block 615 determines $D_{L,n+1}^j(o)$ (e.g., as described with respect to FIG. 4), and passes control to a function block 620. The function block 620 determines $D_{n,n+1}^j(o)$ using $D_{n,n+1}^j(o) = (1-P)D_{R,n}^j(o) + PD_{L,n+1}^j(o)$, and passes control to a function block 625. The function block 625 outputs $D_{n,n+1}^j(o)$, and passes control to an end block 699.

Figure 7:
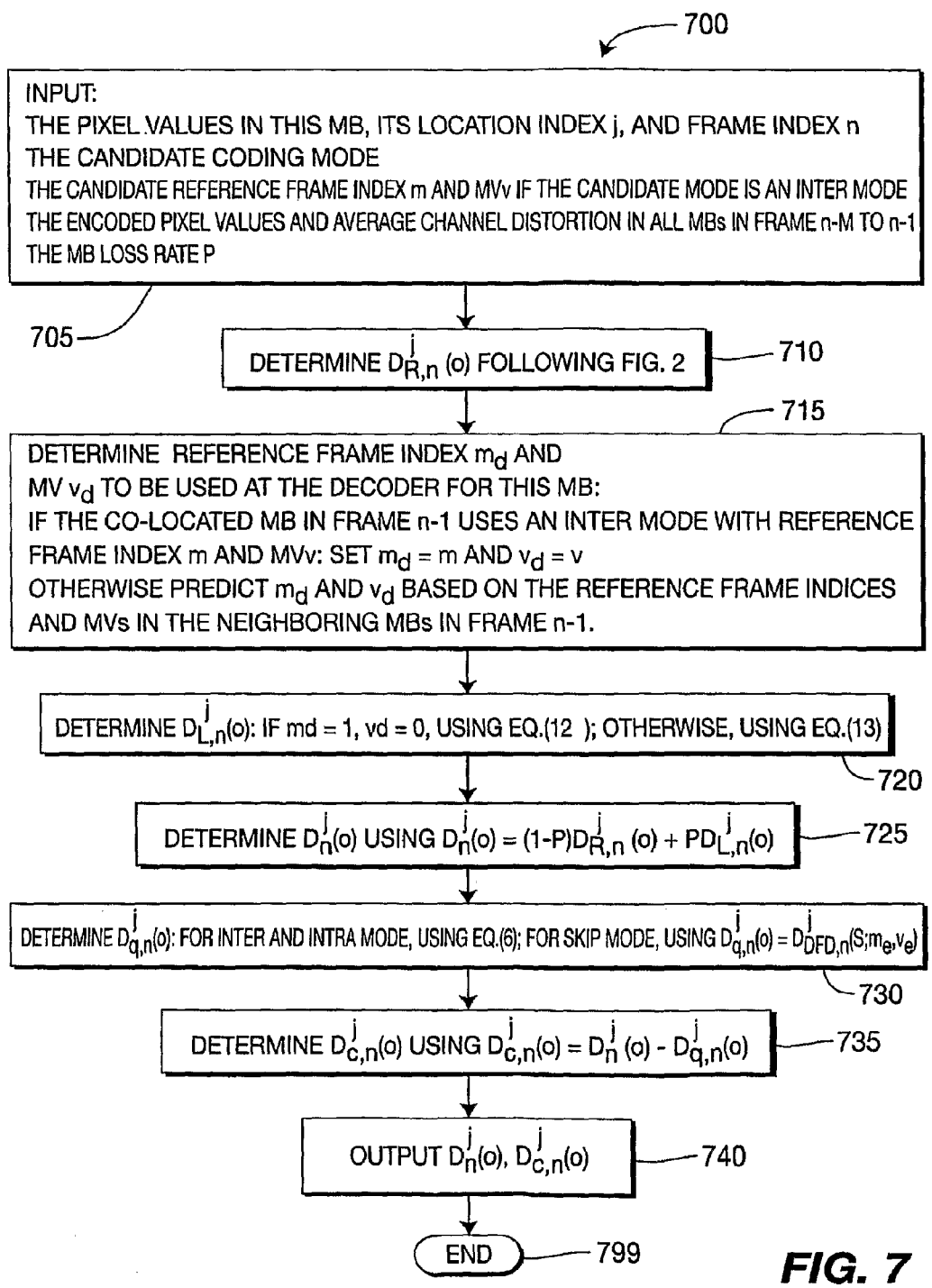
FIG. 7 is a flow diagram for an exemplary method for determining the total expected distortion $D_n^j(o)$ and the channel distortion $D_{c,n}^j(o)$ for a chosen coding option o for a given macroblock (MB) when the decoder uses error concealment method EC3, in accordance with an embodiment of the present principles.

Turning to FIG. 7, an exemplary method for determining the total expected distortion $D_n^j(o)$ and the channel distortion $D_{c,n}^j(o)$ for a chosen coding option o for a given macroblock (MB) when the decoder uses error concealment method EC3 is indicated generally by the reference numeral 700. The method 700 includes a function block 705. The function block 705 inputs pixel values in the macroblock, its location index j, and frame index n, the candidate coding mode, the candidate reference frame index m and motion vector (MV) v if the candidate mode is an INTER mode, the encoded pixel values and average channel distortion in all macroblocks (MBs) in frame n-M to n-1, the macroblock loss rate P, and passes control to a function block 710. The function block 710 determines $D_{R,n}^j(o)$ (e.g., as described with respect to FIG. 2), and passes control to a function block 715. The function block 715 determines reference frame index $m_d$ and MV $v_d$ to be used at the decoder for this macroblock, and passes control to a function block 720. Regarding the function block 715, if the co-located macroblock (MB) in frame n-1 uses an INTER mode with reference frame index m and motion vector (MV) v, then the function block 715 sets $m_d = m$, $v_d = v$. Otherwise, $m_d, v_d$ is predicted based on the reference frame indices and motion vectors in the neighboring macroblocks in frame n-1.

The function block 720 determines $D_{L,n}^j$, and passes control to a function block 725. Regarding the function block 720, and the determination of $D_n^j(o)$, if $m_d = 1$, $v_d = 0$ then Equation (12) is used. Otherwise, Equation (13) is used.

The function block 725 determines $D_n^j(o)$ using $D_n^j(o) = (1-P)D_{R,n}^j(o) + PD_{L,n}^j(o)$, and passes control to a function block 730. The function block 730 determines $D_{q,n}^j(o)$, and passes control to a function block 735.

Regarding the function block 730, for INTER and INTRA modes, Equation (6) is used. For SKIP mode, the following is used: $D_{q,n}^j(o) = D_{DFD,n}^j(S; m_e, v_e)$ The function block 735 determines $D_{c,n}^j(o)$ using $D_{c,n}^j(o) = D_n^j(o) - D_{q,n}^j(o)$, and passes control to a function block 740. The function block 740 outputs $D_n^j(o)$, $D_{c,n}^j(o)$, and passes control to an end block 799.

A description will now be given of some of the many attendant advantages/features of the present invention, some of which have been mentioned above. For example, one advantage/feature is an apparatus having a distortion calculator for calculating an expected distortion for an image block, included in a picture of a video sequence and sent over a lossy channel, using a motion vector for the image block when the motion vector has a non-integer value. The distortion calculator calculates the expected distortion based upon a propagated distortion of at least two neighboring integer pixel positions in a reference picture with respect to the motion vector having the non-integer value. The image block is coded in an inter mode or a SKIP mode.

Another advantage/feature is the apparatus having the distortion calculator as described above, wherein the distortion calculator calculates the expected distortion by applying a scaling factor, having a value between zero and one, to a distortion of the at least two neighboring integer pixel positions.

Yet another advantage/feature is the apparatus having the distortion calculator that calculates the expected distortion by applying the scaling factor, wherein the scaling factor is pre-estimated for all candidate motion vectors for the block that have the non-integer value.

Moreover, another advantage/feature is the apparatus having the distortion calculator as described above, wherein the distortion calculator is included in a video encoder.

Further, another advantage/feature is the apparatus having a distortion calculator for calculating an expected distortion for an image block, included in a picture of a video sequence and sent over a lossy channel, when a deblocking filtering operation is applied to the image block. The distortion calculator calculates the expected distortion based upon a propagated distortion of at least two neighboring integer pixel positions in a reference picture with respect to pixel positions used in the deblocking filtering operation. The image block is coded in an inter mode or a SKIP mode.

Also, another advantage/feature is the apparatus having the distortion calculator as described above, wherein the apparatus further includes an encoder for calculating a Lagrangian cost function that includes the expected distortion when the image block is inter coded and is received by a decoder that performs motion compensated temporal prediction for lost macroblocks using a decoded coding mode and a motion vector for a co-located block in a previously decoded picture.

Additionally, another advantage/feature is an apparatus having an encoder for computing an expected distortion of an inter coded block, included in a picture of a video sequence and sent over a lossy channel, utilizing a deblocking filter operation and a motion vector of the inter coded block. The encoder calculates the expected distortion based upon an impact of distortion from pixel positions in neighboring blocks of the inter coded block that are used in the deblocking filter operation.

Moreover, another advantage/feature is an apparatus having an encoder for calculating an expected distortion of a block, included in a picture of a video sequence and sent over a lossy channel. The encoder calculates the expected distortion based on a coding mode and motion vector for the block and using a decoder error concealment operation wherein the motion vector for the block has a non-integer value.

Further, another advantage/feature is the apparatus having the encoder as described above, wherein the decoder error concealment operation is a frame copy operation.

Also, another advantage/feature is the apparatus having the encoder as described above, wherein the decoder error concealment operation uses encoder coding modes and encoder motion vectors for the block.

Additionally, another advantage/feature is the apparatus having the encoder as described above, wherein the decoder error concealment operation copies encoder coding modes and encoder motion vectors corresponding to a previous picture.

Moreover, another advantage/feature is the apparatus having the encoder as described above, wherein the error concealment operation uses motion-compensated temporal prediction, and the encoder calculates the expected distortion by summing a concealment distortion calculated using the decoder error concealment operation when only the block is lost in the picture and a channel distortion in a motion compensated block in a reference picture pointed to by a motion vector for the block, the channel distortion being scaled down by a scaling factor, and the concealment distortion calculated based on encoded pixel values in the motion compensated block in the reference picture.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus, comprising:
    a distortion calculator for calculating an expected distortion for an image block, included in a picture of a video sequence and sent over a lossy channel, using a motion vector for the image block when the motion vector has a non-integer value, wherein said distortion calculator calculates the expected distortion based upon a propagated distortion of at least two neighboring integer pixel positions in a reference picture with respect to the motion vector having the non-integer value, the image block being coded in an inter mode or a SKIP mode.

2. The apparatus of claim 1, wherein said distortion calculator calculates the expected distortion by applying a scaling factor, having a value between zero and one, to a distortion of the at least two neighboring integer pixel positions.

3. The apparatus of claim 2, wherein the scaling factor is pre-estimated for all candidate motion vectors for the block that have the non-integer value.

4. The apparatus of claim 1, wherein the distortion calculator is comprised in a video encoder.

5. A method, comprising:
    calculating an expected distortion for an image block, included in a picture of a video sequence and sent over a lossy channel, using a motion vector for the image block when the motion vector has a non-integer value, wherein said calculating step calculates the expected distortion based upon a propagated distortion of at least two neighboring integer pixel positions in a reference picture with respect to the motion vector having the non-integer value, the image block being coded in an inter mode or a SKIP mode.

6. The method of claim 5, wherein said calculating step calculates the expected distortion by applying a scaling factor, having a value between zero and one, to a distortion of the at least two neighboring integer pixel positions.

7. The method of claim 6, wherein the scaling factor is pre-estimated for all candidate motion vectors for the block that have the non-integer value.

8. The method of claim 5, wherein the method is performed by a video encoder.

9. An apparatus, comprising:
    a distortion calculator for calculating an expected distortion for an image block, included in a picture of a video sequence and sent over a lossy channel, when a deblocking filtering operation is applied to the image block, wherein said distortion calculator calculates the expected distortion based upon a propagated distortion of at least two neighboring integer pixel positions in a reference picture with respect to pixel positions used in the deblocking filtering operation, the image block being coded in an inter mode or a SKIP mode.

10. The apparatus of claim 9, further comprising an encoder for calculating a Lagrangian cost function that includes the expected distortion when the image block is inter coded and is received by a decoder that performs motion compensated temporal prediction for lost macroblocks using a decoded coding mode and a motion vector for a co-located block in a previously decoded picture.

11. A method, comprising:
calculating an expected distortion for an image block, included in a picture of a video sequence and sent over a lossy channel, when a deblocking filtering operation is applied to the image block, wherein said calculating step calculates the expected distortion based upon a propagated distortion of at least two neighboring integer pixel positions in a reference picture with respect to pixel positions used in the deblocking filtering operation, the image block being coded in an inter mode or a SKIP mode.

12. The method of claim 11, further comprising calculating a Lagrangian cost function that includes the expected distortion when the image block is inter coded and is received by a decoder that performs motion compensated temporal prediction for lost macroblocks using a decoded coding mode and a motion vector for a co-located block in a previously decoded picture.

13. The method of claim 12, wherein said step of calculating the Langrangian cost function is performed by a video encoder.

14. An apparatus, comprising:
an encoder for computing an expected distortion of an inter coded block, included in a picture of a video sequence and sent over a lossy channel, utilizing a deblocking filter operation and a motion vector of the inter coded block, wherein said encoder calculates the expected distortion based upon an impact of distortion from pixel positions in neighboring blocks of the inter coded block that are used in the deblocking filter operation.

15. A method, comprising:
computing an expected distortion of an inter coded block, included in a picture of a video sequence and sent over a lossy channel, utilizing a deblocking filter operation and a motion vector of the inter coded block, wherein said encoding step calculates the expected distortion based upon an impact of distortion from pixel positions in neighboring blocks of the inter coded block that are used in the deblocking filter operation.

16. An apparatus, comprising:
an encoder for calculating an expected distortion of a block, included in a picture of a video sequence and sent over a lossy channel, wherein said encoder calculates the expected distortion based on a coding mode and motion vector for the block and using a decoder error concealment operation wherein the motion vector for the block has a non-integer value.

17. The apparatus of claim 16, wherein the decoder error concealment operation is a frame copy operation.

18. The apparatus of claim 16, wherein the decoder error concealment operation uses encoder coding modes and encoder motion vectors for the block.

19. The apparatus of claim 16, wherein the decoder error concealment operation copies encoder coding modes and encoder motion vectors corresponding to a previous picture.

20. The apparatus of claim 16, wherein the error concealment operation uses motion-compensated temporal prediction, and said encoder calculates the expected distortion by summing a concealment distortion calculated using the decoder error concealment operation when only the block is lost in the picture and a channel distortion in a motion compensated block in a reference picture pointed to by a motion vector for the block, the channel distortion being scaled down by a scaling factor, the concealment distortion calculated based on encoded pixel values in the motion compensated block in the reference picture.

21. A method, comprising:
calculating an expected distortion of a block, included in a picture of a video sequence and sent over a lossy channel, wherein said calculating step calculates the expected distortion based on a coding mode and motion vector for the block and using a decoder error concealment operation wherein the motion vector for the block has a non-integer value.

22. The method of claim 21, wherein the decoder error concealment operation is a frame copy operation.

23. The method of claim 21, wherein the decoder error concealment operation uses encoder coding modes and encoder motion vectors for the block.

24. The method of claim 21, wherein the decoder error concealment operation copies encoder coding modes and encoder motion vectors corresponding to a previous picture.

25. The method of claim 21, wherein the error concealment operation uses motion-compensated temporal prediction, and said calculating step calculates the expected distortion by summing a concealment distortion calculated using the decoder error concealment operation when only the block is lost in the picture and a channel distortion in a motion compensated block in a reference picture pointed to by a motion vector for the block, the channel distortion being scaled down by a scaling factor, the concealment distortion calculated based on encoded pixel values in the motion compensated block in the reference picture.

* * * * *